United States Patent Office 3,163,642
Patented Dec. 29, 1964

3,163,642
17α-THIENYL- AND 17α-THIAZOLYL 3-LOWER ALKOXY-1,3,5(10)-ESTRATRIEN-17β-OLS
Taichiro Komeno, Osaka, Japan, assignor to Shionogi & Co., Ltd., Osaka, Japan
No Drawing. Filed Apr. 23, 1963, Ser. No. 274,945
Claims priority, application Japan Apr. 26, 1962
4 Claims. (Cl. 260—239.5)

The present invention relates to 17α-thienyl- and 17α-thiazolyl 3-lower alkoxy-1,3,5(10)-estratrien-17β-ols.

The said 17α-thienyl- and 17α-thiazolyl 3-lower alkoxy-1,3,5(10)-estratrien-17β-ols are represented by the formula

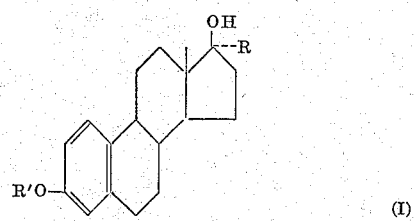

(I)

wherein R is thienyl or thiazolyl and R' is a lower alkyl group (e.g. methyl, ethyl, propyl, butyl).

It is an object of the present invention to embody the 17α-substituted 3-lower alkoxyl-1,3,5(10)-estratrien-17β-ols of Formula I. Another object of the invention is to embody a process for preparing the 17α-substituted 3-lower alkoxy-1,3,5(10)-estratrien-17β-ols (I). A further object of the invention is to embody the physiologically active 17α-substituted 3-lower alkoxy-1,3,5(10)-estratrien-17β-ols (I). These and other objects will be apparent to those conversant with the art to which the present invention pertains from the subsequent description.

The objective 17α-substituted 3-lower alkoxy-1,3,5(10)-estratrien-17β-ol (I) is prepared from 3-lower alkoxy-1,3,5(10)-estratrien-17-one by subjecting the latter to reaction with an organic metal compound containing the group corresponding to the above designated symbol "R," followed by hydrolysis.

The starting 3-lower alkoxy-1,3,5(10)-estratrien-17-one (estrone 3-lower alkyl ether) is a well known compound and can be represented by the formula:

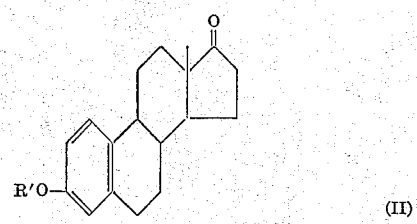

(II)

wherein R' has the same significance as designated above.

According to the process of the present invention, the 3-lower alkoxy-1,3,5(10)-estratrien-17-one (II) is first treated with an organic metal compound containing the group corresponding to the above designated symbol "R" (e.g. thienyl lithium, thienyl sodium, thienyl magnesium halide, thiazolyl lithium, thiazolyl sodium, thiazolyl magnesium halide) in an inert organic solvent (e.g. ether, dioxane, tetrahydrofuran, benzene, toluene) at a temperature from 0 to 100° C., usually at room temperature (10 to 30° C.). The resulting addition product is then hydrolyzed in an acidic medium, preferably by treating the same with an aqueous solution of an acidic salt (e.g. ammonium chloride, ammonium bromide, ammonium sulfate).

The thus-produced 17α-substituted 3-lower alkoxy-1,3,5(10)-estratrien-17β-ol (I) is useful as an antagonist to hormonic substances. For instance, 3-methoxy-17α-(2-thienyl)-1,3,5(10)-estratrien-17β-ol and 3-methoxy-17α-(2-thiazolyl)-1,3,5(10)-estratrien-17β-ol show complete inhibition of gonadotrophin secretion in the parabiotic mice which received subcutaneously a total of 0.1 milligram. Other 17α-substituted 3-lower alkoxy-1,3,5 (10)-estratrien-17β-ols also show similar activities.

Practical and presently-preferred embodiments of the present invention are illustrated in the following examples. In these examples, the abbreviations each have conventional meanings: e.g., mg.=milligram(s), g.= gram(s), ml.=millilitre(s), °C.=degrees centigrade, Anal. Calcd.=analysis calculated.

Example 1

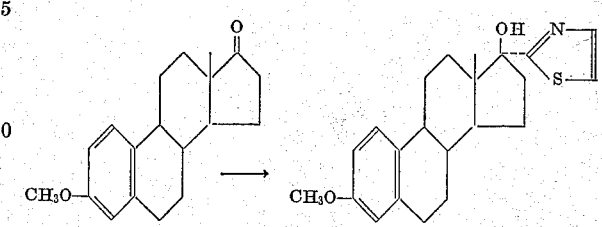

To a solution of metallic lithium (384 mg.) in anhydrous ether (70 ml.), there is added bromobenzene (4.30 g.), and the resultant mixture is stirred in nitrogen stream at room temperature (10 to 30° C.) for about 20 minutes and then refluxed for a while. After cooling the resulting phenyl lithium solution at −30° C., a solution of 2-bromothiazole (2.48 g.) in benzene (20 ml.) is dropwise added thereto and allowed to stand at −10° C. for 30 minutes. To the resulting mixture, there is dropwise added a solution of 3-methoxy-1,3,5(10)-estratrien-17-one (1.56 g.) in benzene (50 ml.), and the mixture is stirred at room temperature overnight. The reaction mixture is combined with an aqueous solution of ammonium chloride and shaken with ether. The ether extract is washed with water, dried and evaporated to dryness. The residue is chromatographed on alumina (40 g.). The eluates with petroleum ether-benzene (1:1∼1:2) and benzene are crystallized from ether and recrystallized from a mixture of acetone and hexane to give 3-methoxy-17α-(2-thiazolyl)-1,3,5(10)-estratrien-17β-ol (1.49 g.) as flat needles melting at 167 to 168° C. $[\alpha]_D^{26}$ +64.6± 2° (chloroform).

UV$\lambda_{max.}^{ethanol}$ mμ (ε): 245 (6,360); 279 (2,080); 287 (1,910)

IR $\nu_{max.}^{Nujol}$ cm$^{-1}$: 3374, 3176, 3116, 1612, 1585, 1504, 1237, 719

Anal.—Calcd. for $C_{22}H_{27}O_2NS$: C, 71.51; H, 7.37; N, 3.79; S, 8.68. Found: C, 71.38; H, 7.42; N, 4.05; S, 8.78.

Example 2

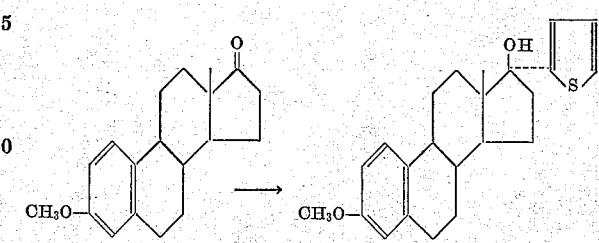

To a solution of butyl lithium prepared from metallic lithium (395 mg.) and butyl bromide (3.86 g.) in anhydrous ether (70 ml.) in nitrogen stream, there is added thiophene (2.37 g.), and the resultant mixture is allowed to stand at −10° C. for 1 hour. To the thus-produced solution of 2-thienyl lithium, there is added a solution of 3-methoxy-1,3,5(10)-estratrien-17-one (1.60 g.) in anhydrous benzene, and the resultant mixture is stirred for 4 hours at room temperature and then allowed to stand overnight. The reaction mixture is combined with an aqueous solution of ammonium chloride and shaken with ether. The ether extract is washed successively with an aqueous solution of sodium carbonate and water, dried and evaported to dryness. The residue is crystallized from ether and recrystallized from a mixture of dichloromethane and acetone to give 3-methoxy-17α-(2-thienyl)-1,3,5(10)-estratrien-17β-ol (1.46 g.) as prisms melting at 190 to 192° C. $[\alpha]_D^{25}$ +71.5±2° (chloroform).

UV $\lambda_{max.}^{ethanol}$ m$\mu$($\epsilon$): 227 (14,700), 231 (15,100), 279 (2,050), 287.5 (1,850). IR $_{max.}^{Nujol}$ cm$^{-1}$: 3607, 3143, 3093, 3035, 1610, 1586, 1504, 1237, 725

What is claimed is:
1. 3-lower alkoxy-17α-(2-thiazolyl)-1,3,5(10)-estratrien-17β-ol.
2. 3 - methoxy - 17α-(2-thiazolyl)-1,3,5(10)-estratrien-17β-ol.
3. 3-lower alkoxy-17α-(2-thienyl)-1,3,5(10)-estratrien-17β-ol.
4. 3-methoxy-17α-(2-thienyl)-1,3,5(10)-estratrien-17β-ol.

References Cited in the file of this patent
UNITED STATES PATENTS
2,330,215     Hildebrandt     Sept. 28, 1943